Dec. 29, 1970   W. L. PRINGLE   3,550,456
REMOTE ADJUSTABLE MIRROR
Filed Dec. 3, 1968
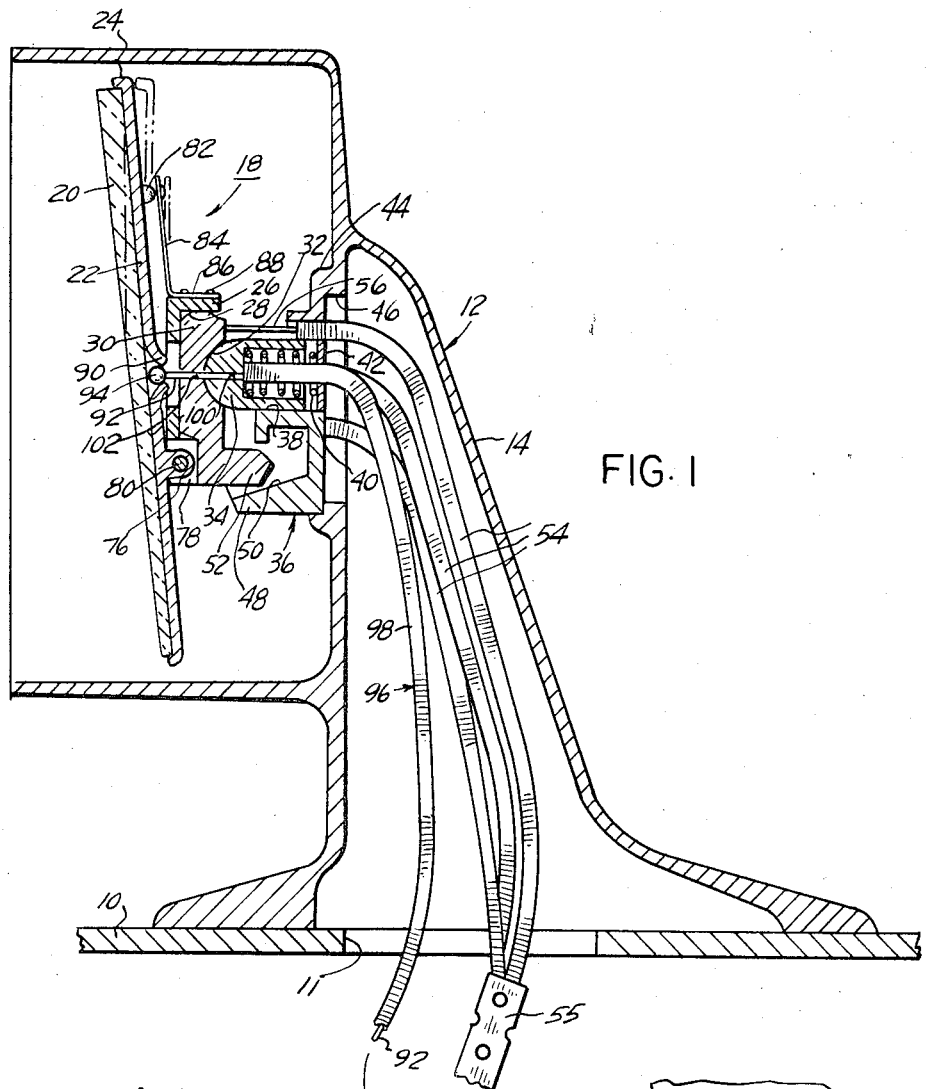
INVENTOR
WILLIAM L. PRINGLE
BY Hauke, Kram, Gifford, & Pataldis
ATTORNEYS

United States Patent Office 3,550,456
Patented Dec. 29, 1970

3,550,456
REMOTE ADJUSTABLE MIRROR
William L. Pringle, Grosse Pointe Shores, Mich., assignor to Lee Radke Associates, Inc., Detroit, Mich., a corporation of Michigan
Filed Dec. 3, 1968, Ser. No. 780,737
Int. Cl. F16c 1/10; G02b 7/18
U.S. Cl. 74—501                                         11 Claims

ABSTRACT OF THE DISCLOSURE

A remotely adjustable rearview mirror for vehicles adjustable in two angular positions in response to "day" or "night" driving conditions comprising a prismatic mirror secured to a mirror base which is pivoted for linear angular movement in an up and down position and having a cable attachment at its center to allow repositioning of the mirror from a remote position.

BACKGROUND OF THE INVENTION

(I) Field of the invention

The present invention refers in general to remotely adjustable rearview mirrors and more specifically to a remotely adjustable rearview mirror to compensate for "day" or "night" driving conditions.

Mirrors of this type, which are adapted to be moved into two angular positions in a linear direction for the purpose of dimming headlight glare or the like during night driving, have been proposed heretofore and include a prismoidal mirror having two different reflective surfaces to provide a highly intense image during the "day" driving and when moved in a different angular position provide a dimmed image of reduced intensity during "night" driving. These mirror constructions are of advantage and highly desirable to substantially eliminate headlight glare from following automobiles during night driving or glare from other light sources without impeding the clear view of the road behind.

(II) Brief description of the prior art

The most conventional practice of employing prismoidal rearview mirrors has been in connection with inside rearview mirrors which, aside from the swivel support to adjust the mirror to the particular requirement of an operator, has a lever actuating mechanism to linearly tilt the mirror for "day" or "night" driving conditions. Attempts have been made heretofore to provide outside rearview mirrors with the same feature, which would be highly desirable, and to combine it with a remote control. These prior attempts provided for centrally pivoting the mirror around a transverse axis for linear tilting movement or they made provisions to tilt the mirror supporting bracket. The latter provision is objectionable due to the high cost of manufacturing and difficult assembly, as well as to its vulnerability since the bracket pivoting mechanism is exposed and thus subject to corrosion and damage.

As far as is known, no successful attempt has been made to incorporate such a feature in a remotely controlled outside rearview mirror adapted to vary the relative position of the mirror for maximum viewability as required by any particular operator.

SUMMARY OF THE INVENTION

The present invention provides control means for linear angular tilting movement of the mirror in response to "day" or "night" driving conditions embodied in a remotely controlled outside rearview mirror. This is accomplished independently of the remote control for adjusting the mirror in accordance to the preference of any particular operator so that the operator can adjust the mirror to suit his particular viewing requirement in either "day" or "night" position of the mirror and without disturbing the previously adjusted "day" or "night" set-up.

In the present invention, a remote control mechanism for an outside rearview mirror is provided for adjusting the mirror to personal preference and which embodies a further remote mechanism and control to linearly tilt the mirror from a first position to a second position to substantially eliminate or dim the glare of any kind of light source projected onto the mirror.

The second mechanism is completely independent from the first control mechanism and adjusting action of either one of these mechanisms will in no way affect the other mechanism.

The remote control mechanism for tilting the mirror between two positions includes a single Bowden type control cable attached to the center of the mirror and to an operator control in the vehicle in close proximity and integral with the operator control for the conventional mirror positioning mechanism, although independent therefrom, and the mirror is pivoted for tilting movement on a transverse axis remote from the center of the mirror located on the pivot member for adjusting the mirror for personal viewing requirements so that adjustment of the mirror does not affect the original "day" or "night" driving position of the mirror or vice versa.

BRIEF DESCRIPTION OF THE DRAWINGS

Additional novel features and advantages will become apparent by reference to the following detailed description of the preferred embodiment thereof in connection with the accompanying drawings in which:

FIG. 1 is a cross section through an exemplary outside rearview mirror and support illustrating the pivot locations and cable attachments;

FIG. 2 is a further cross section through the interior operator control mechanism for controlling the mirror in FIG. 1; and FIG. 3 is an enlarged side view of the actuating lever arrangement and exemplary detent means to lock the actuating lever in either "day" or "night" driving position.

DESCRIPTION OF THE PREFERRED EMBODIMENT

With reference to the figures, in FIG. 1 there is indicated at 10 the outer panel of a vehicle body structure which may be a door or fender of the vehicle to which is connected by conventional means the present novel mirror structure 12, which is composed in general of a hollow support bracket 14 which interiorly communicates with an aperture 11 of the panel 10.

The upper end of the support bracket 14 is integral with or supports an enclosed housing 16 which protectively encloses a mirror assembly 18. The mirror assembly comprises a mirror member 20 of preferably prismoidal configuration, that is, of a varying cross section from the top end to the lower end to provide reflective surfaces of different intensities depending on the angular tilted position of the mirror. The mirror member is securely attached to a mirror base 22 as by an adhesive and is circumferentially confined within an annular flange 24 of the mirror base. The mirror base itself is attached to a pivot support 26 which is centrally recessed at 28 to receive a pivot member 30. The pivot member 30 has a semispherical socket 32 for the reception of a ball member 34 which is longitudinally movably supported within an aperture 38 of an adapter 36. The ball member 34 is biased outwardly of its support into contact with a socket 32 by means of an expansion spring 40 disposed within the ball member and abutting outwardly against a snap ring 42 or the like positioned within the aperture 38 for containment of the spring. The adapter 36 is contained and secured within a widened flange portion 44 of an aperture 4 in enclosure 16 which is in communication with the interior of the support bracket 14. The adapter 36 has a forwardly, that is, towards the mirror, extended portion 48 which is provided with a recess 50 adapted to receive a finger or the like 52 extending from the pivot support 26 into the recess to prevent rotation of the mirror assembly.

In order to remotely adjust the mirror member for maximum viewability a plurality of control cables 54 (usually three) are provided which are of the Bowden type and which have their sheathings at one end secured within the adapter 36. The wires 56 supported within the cables for longitudinal movement therein are at the mirror end secured to the pivot member 30 in any suitable known manner. The control cables 54 may be grouped into an assembly by a common sheathing 55 to facilitate the threading through the vehicle body structure and, as seen in FIG. 2, are at the other end connected within a cable support member 58 which is suitably secured within the bottom portion of a control knob enclosure 60 disposed within an aperture 62 of an internal body panel member 64 of the vehicle door, dashboard or the like. The individual wires 56 at the control end extend out of the cable support 58 for securement to a pivot member 66 in any known fashion. The pivot member 66 is inserted and retained within the central recess 68 of the control button or knob 70 which is wholly enclosed within the knob enclosure 60 so as not to protrude therefrom. The outside of the pivot member 66 is provided with a semispherical socket 72 adapted to be engaged by a ball member 74 which is secured within the cable support 58. Thus, the control button or knob 70 is supported on the ball member 74 for rocking movement therearound in any angular direction.

A more detailed description of this type of cable control mechanism for remotely controlled devices may be found in U.S. Pats. 3,442,150 and 3,442,151. The mechanism so far described forms no part of the present invention other than in combination as recited in the appended claims. It will be evident from the description that upon pivotal rocking movement of the control button or knob 70 by the operator or occupant of the vehicle this motion will be transferred through the cable wires 56 to the mirror assembly 18 to produce a like rocking movement of the mirror, thus adjusting the mirror into the desired maximum viewing position as required by the particular individual.

Obviously, as will become clear, similar other equivalent remote control mechanisms may be substituted without affecting the operational characteristic of the novel remote control mechanism for tilting movement of the mirror between two distinct angular positions as will be described hereinafter.

In order to adjustably tilt the prismoidal mirror member 20 in response to "day" or "night" driving conditions in addition to the independent multiple adjustment of the mirror for viewing ability the rearside of the mirror base 22 below the axis thereof is provided with a rearwardly extending hinge member 76 which extends into a recess 78 provided within the pivot support 26 of the mirror and which is connected therein for linear rocking movement of the mirror base by a pin 80. Towards the top of the mirror assembly the mirror base 22 is provided with a boss 82 extending from the rear side for abutment against the upper end of a leaf spring 84 whose base 86 is secured to the top of the pivot support 26 by means of fasteners 88. Thus, normally the leaf spring 84 tends to rotate the mirror assembly 18 around the pivot pin 80 away from the pivot support 26. The movement, however, is resisted as follows: the center of the mirror base 22 is stamped to provide an apertured recess 90 behind the mirror member 20 into which a wire 92 extends. The end of the wire 92 within the recess is provided with an enlarged head 94 such as a button or knob to retain the wire on the mirror base 22. The wire 92 is the moving part of of a Bowden cable assembly 96 having a sheathing 98 which encloses the wire 92. The cable sheathing 98 extends through the aperture 46 of the enclosure and into the ball member 34 to be suitably clamped against movement by any well known method (not shown) to permit the wire 92 to extend through an aperture 100 in the head of the ball member and through another coaxial aperture 102 within the pivot member for free movement therein and attachment to the mirror base 22 as described.

The cable assembly 96 extends through the support bracket 14 to be threaded through appropriate body portions of the vehicle similar to the cables 54 to permit clamping of the other end of the cable sheathing 98 within the cable support 58 of the control knob enclosure 60. As seen in FIG. 2, the movable wire 92 extends out of the cable support towards the control button 70 to be attached to the end of a control lever 104 which is pivotally positioned as at 106 within the button enclosure 60 underneath the control button 70. The inner portion of the control button 70 is suitably recessed as shown at 108 to provide clearance for manipulation of the lever 104 or respectively rocking movement of the control button 70.

The actuating end of the control lever 104 extends through an elongated aperture 110 in the side wall 112 of the knob enclosure 60 and preferably to the underside thereof, as shown, for the protection of the occupant of the vehicle by accidental contact with the protruding lever. As illustrated in FIG. 3 on an enlarged scale, a detent member 114 in the form of a corrugated hairpin spring may be attached within the aperture by means of a flange section 116 of the spring with which the spring is attached to the knob enclosure 60. The corrugations of the detent member 114 provide a first locked position "D" for the lever 104 indicating the "day" driving position of the mirror member 20, and a second locked position "N" indicating the "night" driving position of the mirror member 20. Thus, the alternate positions of the mirror can be locked in place by flipping the lever 104 into the desired position "D" or "N." The spring detent is sufficient to maintain the selected position under any normal driving conditions. It will be obvious that similar equivalent detent means may be used instead of the arrangement shown since various other detent means are known in the art.

The device operates as follows: normally the lever 104 will be kept in the "day" driving position "D" maintaining the prismoidal mirror 20 in such vertical angular position as to obtain an image of maximum brightness. However, during "night" driving the brightness of the mirror image becomes a hazard since it produces glare by the projection of the bright light rays from the headlights of following cars. In this instance, the operator flips the lever 104 to the position "N" which causes the wire 92 of the cable assembly 96 to exert a push on the mirror assembly 18 to rotate the mirror around the pivot pin 80 to the position shown in solid lines in FIG. 1. In this position of the mirror, due to its prismoidal construction, a considerably dimmed mirror image will be reflected without affecting the range of view.

The leaf spring 84 exerts a constant bias on the mirror opposite the pivot pin connection to maintain tightness of the wire 92 and eliminate the possibility of any slack therein.

Although the present invention is herein shown and described in connection with a remote mirror adjustment mechanism, it will be understood that the present novel "day" or "night" mirror adjustment can be used alone.

Thus, with the present invention, an improved remote control for prismoidal mirror has been provided which is effective at the flip of a lever to adjust the prismoidal mirror to the respective "day" or "night" driving conditions and to resiliently lock the selected position and further provide means to maintain the wire control under tension so as to eliminate any slack.

Although a preferred embodiment has been disclosed, the present invention may be embodied in other forms without departing from the spirit and essential characteristic thereof. Therefore, the present embodiment is to be considered in all respects as illustrative only and not restrictive, the scope of the invention being indicated by the appended claims rather than by the foregoing description.

What is claimed is:

1. In a remotely controlled rearview mirror assembly including a support for said mirror and a first actuator positioned remote from said support, universal pivot means associated with said support, a mirror including a base mounted on said pivot means, first motion transmitting control means connecting said mirror with said first actuator so that upon actuation of said control means by said first actuator said mirror will be adjusted angularly around said universal pivot means; the improvement comprising: a second actuator mounted remote from said support, second motion transmitting control means connecting said mirror with said second actuator, means tiltably mounting said mirror on said support, and said second actuator being movable from a first to a second position for actuation of said second control means to tilt said mirror independently of said angular adjustment of said mirror by said first control means around said universal pivot means, said first motion transmitting control means comprising a plurality of cables of the Bowden type having operable wire elements connected at one end to said universal pivot means and at the other end to said first actuator, said first actuator being mounted for rocking movement, said second motion transmitting control means comprising a single cable of the Bowden type having an operable wire element connected at one end to said mirror base and at the other end to said second actuator, said second actuator being mounted for pivotal movement independently of said first actuator and resilient detention means associated with said second actuator to lock said second actuator in said first or said second positions.

2. In the mirror assembly as defined in claim 1 in which said operable wire element of said second motion transmitting control means is connected to said mirror base at a point remote from said tiltable mounting means of said mirror.

3. In the mirror assembly as defined in claim 2 providing tensioning means disposed between said mirror and said support directly opposite from said tiltable mounting means for tensioning said wire element.

4. In the mirror assembly as defined in claim 3 said tensioning means comprising a leaf spring attached to said support having a cantilever spring arm abutting against said mirror base.

5. A remotely controlled day-night mirror assembly comprising: a support, mirror means having first and second reflecting surfaces of different reflecting power disposed at an acute angle relative to one another and movable supported on said support for universal movement relative thereto; first actuator means operatively connected to said mirror means for adjusting the universal position of said mirror means relative to said support to select a primary viewing position for said first reflecting surface, second actuator means operatively connected to said mirror means and movable between first and second positions for moving said mirror means angularly about an axis and independently of said first actuator means between said primary viewing position and a secondary viewing position whereat said second reflecting surface is in the viewing position, thereby to selectively present one of said reflecting surfaces when said mirror means is in any selected position to which it has been moved by said first actuator means.

6. An assembly as set forth in claim 5 wherein said mirror means includes a base, said support includes pivot means for universally supporting said base, said first actuator means being connected to said pivot means for for universally moving said base.

7. An assembly as set forth in claim 6 including means supporting said base on said support for tilting movement independently of said universal movement, said second actuator means being connected to said base for tilting said base between said primary viewing position and said secondary viewing position.

8. An assembly as set forth in claim 5 wherein said second actuator means is movable relative to said first actuator means and including detention means for retaining said second actuator means in said first and second positions respectively.

9. An assembly as set forth in claim 8 wherein said mirror means includes a base, said support includes pivot means for universally supporting said base, said first actuator means being connected to said pivot means for universally moving said base.

10. An assembly as set forth in claim 9 including an actuator housing, said first actuator means includes an actuator member universally supported by said actuator housing and motion transmitting means operatively interconnecting said actuator member and said base.

11. An assembly as set forth in claim 10 wherein said second actuator means includes a lever movably supported by said actuator housing for movement relative to said actuator member.

References Cited

UNITED STATES PATENTS

| | | | |
|---|---|---|---|
| 1,913,874 | 6/1933 | Folberth et al. | 350—279 |
| 2,052,770 | 9/1936 | Hofer | 350—279 |
| 3,046,841 | 7/1962 | Kawecki | 74—501X |
| 3,253,509 | 5/1966 | Peters | 350—281 |
| 3,442,150 | 6/1969 | Brawner et al. | 74—501 |

FOREIGN PATENTS

| | | | |
|---|---|---|---|
| 1,046,516 | 12/1958 | Germany | 350—279 |
| 1,031,115 | 5/1966 | Great Britain | 350—280 |

MANUEL A. ANTONAKAS, Primary Examiner

U.S. Cl. X.R.

350—279